under 35 U.S.C. 154(b) by 294 days.

(12) United States Patent
Boshev et al.

(10) Patent No.: US 10,084,839 B2
(45) Date of Patent: Sep. 25, 2018

(54) UPLOAD OPERATION USING MULTIPLE CONNECTIONS

(71) Applicant: SAP SE, Walldorf (DE)

(72) Inventors: Stoyan Boshev, Sofia (BG); Hristo Ilev, Sofia (BG); Shenol Yousouf, Sofia (BG); Georgi Gerginov, Sofia (BG)

(73) Assignee: SAP SE, Walldorf (DE)

( * ) Notice: Subject to any disclaimer, the term of this patent is extended or adjusted under 35 U.S.C. 154(b) by 294 days.

(21) Appl. No.: 14/141,489

(22) Filed: Dec. 27, 2013

(65) Prior Publication Data

US 2015/0188969 A1 Jul. 2, 2015

(51) Int. Cl.
| | |
|---|---|
| *G06F 15/16* | (2006.01) |
| *H04L 29/06* | (2006.01) |
| *G06F 9/54* | (2006.01) |
| *H04L 29/08* | (2006.01) |
| *H04L 12/801* | (2013.01) |

(52) U.S. Cl.
CPC .......... *H04L 65/602* (2013.01); *H04L 65/608* (2013.01); *H04L 65/80* (2013.01); *H04L 69/14* (2013.01); *G06F 9/544* (2013.01); *H04L 47/10* (2013.01); *H04L 67/06* (2013.01)

(58) Field of Classification Search
CPC ......... H04L 67/10; H04L 69/22; H04L 67/06; H04L 67/1097; H04L 41/0896; H04L 47/10; H04L 69/14; G06F 9/52; G06F 2209/547; G06F 9/542; G06F 2207/2254; G06F 9/544; G11C 11/4076; G11C 7/222; G11C 2207/2254

See application file for complete search history.

(56) References Cited

U.S. PATENT DOCUMENTS

| | | | | |
|---|---|---|---|---|
| 5,903,724 | A * | 5/1999 | Takamoto | H04L 1/1809 |
| | | | | 709/200 |
| 8,009,672 | B2 * | 8/2011 | Brown | H04L 29/06 |
| | | | | 370/392 |
| 8,190,740 | B2 | 5/2012 | Stienhans et al. | |
| 8,402,086 | B2 | 3/2013 | Driesen et al. | |
| 8,473,585 | B1 * | 6/2013 | Smith | H04L 67/06 |
| | | | | 709/218 |
| 8,527,633 | B2 | 9/2013 | Bade et al. | |
| 8,572,612 | B2 | 10/2013 | Kern | |
| 8,612,599 | B2 | 12/2013 | Tung et al. | |
| 8,620,889 | B2 | 12/2013 | Sagar et al. | |
| 8,650,298 | B2 | 2/2014 | Daly et al. | |
| 8,650,303 | B1 | 2/2014 | Lang et al. | |
| 8,654,971 | B2 | 2/2014 | Orsini et al. | |
| 8,655,989 | B2 | 2/2014 | Ritter et al. | |
| 2009/0106393 | A1 * | 4/2009 | Parr | H04L 63/0428 |
| | | | | 709/218 |
| 2011/0022684 | A1 * | 1/2011 | Nakao | H04L 67/06 |
| | | | | 709/219 |

(Continued)

*Primary Examiner* — David R Lazaro
(74) *Attorney, Agent, or Firm* — Buckley, Maschoff & Talwalkar LLC (57) ABSTRACT

A client system requests to upload an input data stream to a server system. The input data stream is split to a sequence of chunks. The chunks are transferred in parallel by a number of connections from the client system to the server system. At the server system, the transferred chunks are merged into an output stream according to the sequence. The output stream represents the rebuilt input stream.

12 Claims, 5 Drawing Sheets

(56) References Cited

U.S. PATENT DOCUMENTS

| | | |
|---|---|---|
| 2011/0138047 A1 | 6/2011 | Brown et al. |
| 2011/0289119 A1 | 11/2011 | Hu et al. |
| 2012/0054534 A1* | 3/2012 | Tsao .................. H04L 1/1896 714/4.1 |
| 2012/0254485 A1* | 10/2012 | Tamura .................. G06F 9/544 710/56 |
| 2013/0031240 A1 | 1/2013 | Byzek |
| 2013/0097320 A1 | 4/2013 | Ritter et al. |
| 2013/0198464 A1* | 8/2013 | Sharma .................. G06F 12/06 711/157 |
| 2013/0332612 A1* | 12/2013 | Cai .................. G06F 9/5066 709/226 |
| 2014/0059226 A1 | 2/2014 | Messerli et al. |
| 2014/0173627 A1* | 6/2014 | Archer .................. G06F 9/52 718/106 |
| 2014/0181021 A1* | 6/2014 | Montulli ........... G06F 17/30174 707/624 |
| 2014/0297735 A1* | 10/2014 | Aoyagi ................. H04L 67/108 709/203 |
| 2015/0163301 A1* | 6/2015 | Narayanan .......... H04L 67/1095 709/205 |
| 2015/0188985 A1* | 7/2015 | Marty ................. H04L 63/0227 709/218 |

* cited by examiner

UPLOAD OPERATION USING MULTIPLE CONNECTIONS

BACKGROUND

A deployment operation to a cloud platform commonly entails a transfer of application binaries over a network from a user host to processing nodes of the cloud platform. The application binaries may vary in size. Also, networks through which the application binaries are transferred may vary in speed and bandwidth. Nevertheless, the transfer of the application binaries takes a major portion of the whole deployment time, compared to the time for the actual processing of the binaries by the processing nodes. Thus, the network often acts as a bottleneck for the deployment operation and may slow it down. Slow upload and deployment may negatively affect the user experience and could keep a session open for long time, for example, up to several hours.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for upload operation using multiple connections are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A single connection may be shaped or limited to a certain speed. For example, networks may often be characterized by shaping and imposing limitations on the speed of individual connections. The allowed speed of the individual connections may often be just a small portion of the whole available bandwidth of the network. This may be done, to avoid a case where a single connection consumes major portion from the available network bandwidth, preventing other connections from utilizing the network. For example, corporate networks may often impose such limitations, so that the available bandwidth is distributed more evenly among entities in the network. If the speed of the connection is for instance 100 KB/sec, a file with approximately 3.6 GB size would be transferred or uploaded for an hour. With such speed, customer applications of regular size could be uploaded or deployed to a cloud computing platform for an hour or more.

In the context of content transfer, deployment may include packaging or zipping the content to be deployed, transferring or uploading the packaged content from a client system to an administrative server (e.g., an orchestrator) of the cloud computing platform, optionally un-packaging the packaged content, and transferring the content to a file system of the cloud computing platform, e.g., a cloud platform repository. Today, a single network connection is used for both transfers—the transfer from the client system to the administrative server and, the transfer from the administrative server to the cloud platform repository. While the transferring from the administrative server to the cloud platform repository may be running within a network that may be with higher speed (e.g., internal network of the cloud platform provider), the transfer from a client system to the administrative server often may suffer from network speed limitations. Using a single connection, limited in speed, for any upload or content transfer operation may negatively impact user experience. For example, a deploy session may be kept open for a long time on the administrative server. While the deploy session is open computing resources are being consumed increasing the total cost of ownership.

Although a single connection may be limited in speed, still multiple connections from different programs may access the same Internet address. Speed of a deployment or any upload operation may be improved by using the number of connections permitted for a particular network and using those connections to one and the same address. In one embodiment, a multiple connections protocol is implemented on top of the HTTP protocol. The multiple connections protocol supports transferring input data over multiple HTTP connections in parallel. By transferring input data over multiple connections in parallel higher speed of the upload or deploy operation may be achieved compared to transferring data over a single one. With the multiple connections protocol, the speed of the data upload or transfer is limited by the available bandwidth capacity instead of the speed of a single shaped connection. Therefore, maximum bandwidth of the network may be utilized for an upload operation by the multiple connections, according to some embodiments.

Figure 1:
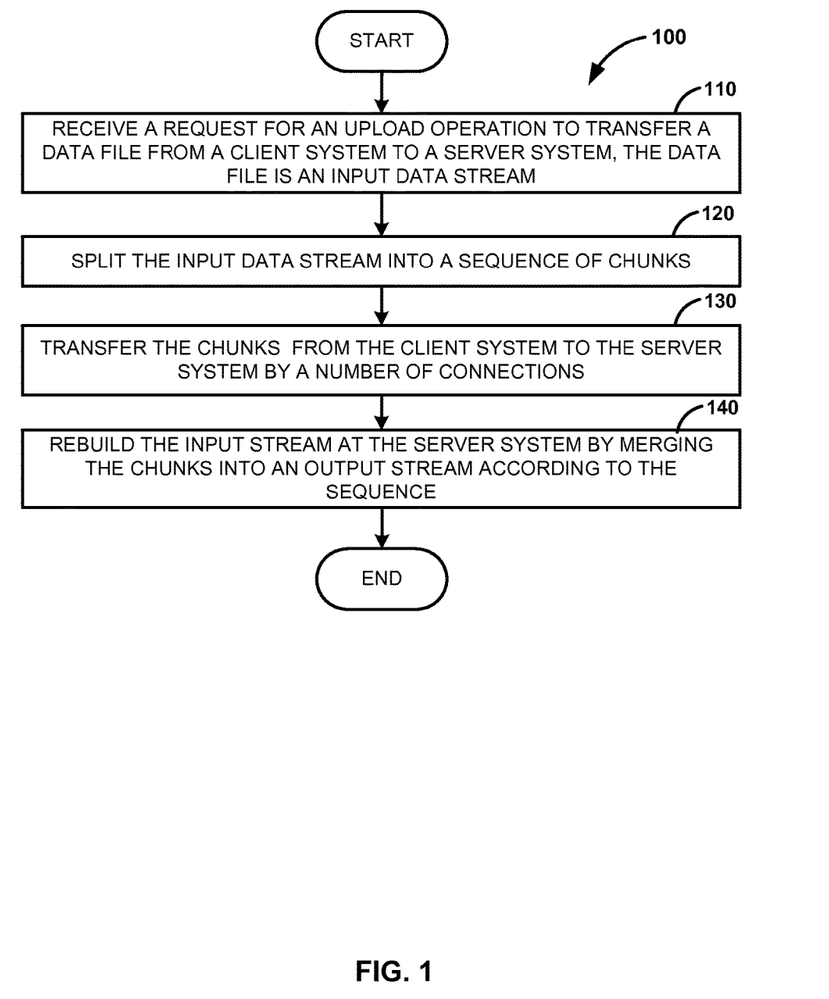
FIG. 1 illustrates a process to upload data from a client system to a server system using multiple connections, according to some embodiments

FIG. 1 illustrates process 100 to upload data from a client system to a server system using multiple connections, according to one embodiment. At 110, a request for an upload operation is received. The upload operation to transfer a data file from the client system to the server system. The data file is an input data stream for the upload operation. In the context of data transfer, a data file may be viewed as a data stream as it is read and processed, for example, byte by byte. At 120, the input data stream is split into a sequence of chunks. A chunk is a portion of data from a data stream. The chunk further includes a chunk identifier and a chunk size. The chunk identifier is a consecutive number of the portion of data in the data stream. Thus, the chunk identifier represents the order of the chunk in the data stream and identifies the chunk itself. Chunk identifiers may be used to restore or rebuild the input data stream at the server system. A chunk size may represent the size of the portion of data represented by the chunk, in bytes, for example. Therefore, a chunk includes a portion of data from a data stream, a consecutive identifier of the chunk in the stream, and a size of the portion of data represented by the chunk. Chunks size may be predetermined. For example, chunks size may be fixed to 8 KB. Size of the last chunk in the sequence of chunks may vary. The multiple connections protocol may support also variable chunks size, according to some embodiments.

At 130, the chunks are transferred from the client system to the server system by a number of connections. In one embodiment, the connections are based on a protocol from the Internet protocol suite on a level higher than the transport layer such as a protocol from the application layer. For example, the connections may be based on Hypertext Transfer Protocol (HTTP) or HTTP Secure protocol. The chunks may be transferred in parallel by the connections to speed up the upload operation. At 140, the input stream is rebuilt at the server system. The input stream is rebuilt by merging the chunks into an output stream according to the sequence.

Figure 2A:
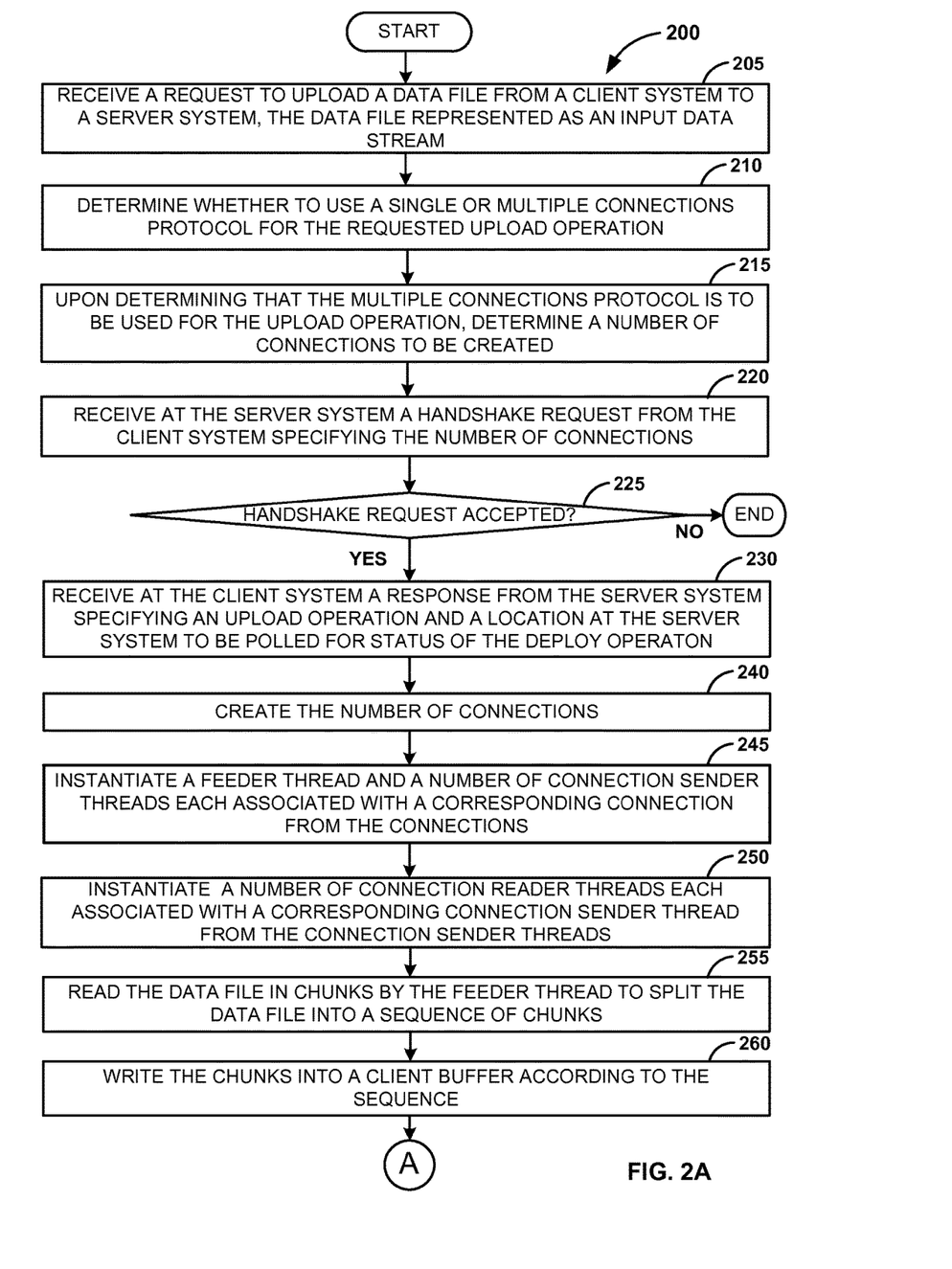
FIGS. 2A-B illustrates a process to upload a data file from a client system to a server system using multiple connections, according to some embodiments.
Figure 2B:
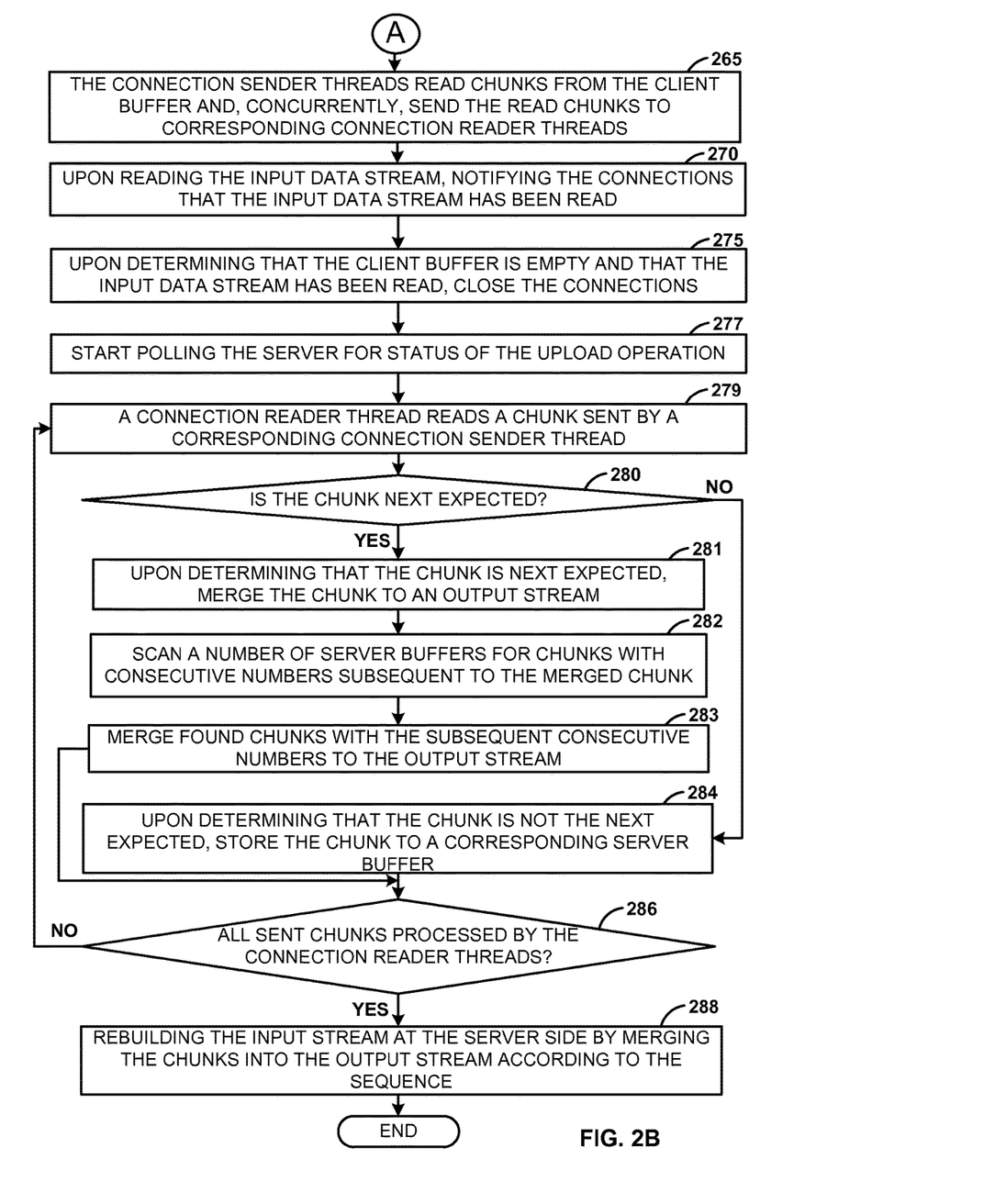

FIGS. 2A-B illustrate process 200 to upload a data file from a client system to a server system using multiple connections, according to one embodiment. At 205, a request to upload the data file from the client system to the server system is received. At 210, it is determined whether a single or multiple connections protocol is to be used for the requested upload operation. In one embodiment, the client system determines whether to use single or multiple connections protocol based on the size of the data file to be uploaded. For example, multiple connections protocol may be used for data files with size above a predefined threshold, e.g., 5 MB. Whether a multiple connections protocol is to be used may also depend on whether the client system is configured with a thread-safe connection manager.

Upon determining that the multiple connections protocol is to be used for the upload operation, at 215, determine a number of connections to be created. In one embodiment, the number of connections may remain constant for the whole span of the upload operation. In another embodiment, the number of connections may be intelligently increased or decreased on the fly proportionate to demand. The intelligent adjustment of the number of connections may depend on, for example, transfer speed and/or other parameters. For example, the number of connections may be iteratively increased upon determining that when a new connection is added the transfer speed is increased. Thus, connections may be iteratively increased until the network bandwidth is optimally utilized. In one embodiment, a user of the client system may configure the number of connections. Thus, the number of connections may be configurable parameter or intelligently adjustable on the fly.

Upon determining the number of connections to be created, at 220, a handshake request from the client system is received at the server system. The handshake request specifying the number of connections. The number of connections to be used for the upload operation. At 225, it is checked whether the handshake request is accepted. In one embodiment, the server system may deny the request, for example, if the server system is not configured to communicate over the requested protocol from the client system. For example, the server system may not be configured to communicate over the multiple connections protocol, then the handshake is denied and the upload operation to be performed over the single connections protocol. When the handshake is accepted, at 230, a response is received from the server system. The response from the server system specifying an upload operation identifier. The upload operation identifier to be referenced by the number of connections. Further, the response specifies a location, e.g., a uniform resource locator (URL), at the server system to be polled for status of the upload operation. For example, status is polled to determine whether the upload operation is still running or whether it is finished successfully or not. In one embodiment, based on the upload operation identifier, the location at server system may be polled for status of the upload operation.

In one embodiment, initially the client system creates a single HTTP connection from the client system to the server system. At 230, the number connections are created. Each connection from the created connections is associated with a connection identifier and the upload operation identifier for which the connection will transfer data. At 245, a feeder thread is instantiated. Further, a number of connection sender threads are instantiated. The feeder thread and the connections sender thread may be created by the client system. Each connection sender thread is associated with a corresponding connection from the number of created connections. In one embodiment, a connection sender thread is associated with a single connection from the created connections. Thus, the connection sender thread maintains a single connection to the server system through which chunks read by the connection sender thread are sent. Maintaining a single connection by a thread may be done for optimization purposes. When a single connection is maintained by the connection sender thread, a single request to the server system is executed for the chunks read by the connection sender thread as opposed to a separate request to the server system for each read chunk, which could overload the server system.

At 250, a number of connection reader threads are instantiated. Each connection reader thread is associated with a corresponding connection sender thread from the connection sender threads. Respectively, each connection reader thread associated with the corresponding connection associated with the connection sender thread. In one embodiment, the connection reader threads may be created by the server system, upon creating the connections and the connection sender threads. Threads, either connection sender or reader, perform processing related to the connection for which the thread is created. For example, a thread reads data from an input data stream, writes the data to the respective associated connection, and sends the data through the connection.

At 255, the data file is read in chunks by the feeder thread to split the data file into a sequence of chunks. The feeder thread receives as input data stream the data file. At 260, the feeder thread writes the chunks into a client buffer according to the sequence. The client buffer may be a queue on the client system that serves as cache for the connection sender threads. When chunks written in the client buffer reach size bigger than a predefined threshold, further entries of chunks may be blocked, according to one embodiment.

At 265, the connection sender threads read chunks from the client buffer and, concurrently, send the read chunks to the corresponding connection reader threads. In one embodiment, a connection sender thread reads next unread chunk from the client buffer and sends that chunk to a corresponding connection reader thread at the server system. Once the connection sender thread sends the chunk, the connection sender thread reads next unread chunk from the client buffer. In parallel, one or more other connection sender threads may read unread next chunks from the client buffer and send them to corresponding connection reader threads. Thus, chunks are continuously read and sent in parallel by the connection sender threads, reusing the same HTTP connections.

Upon reading the input data stream, at 270, the feeder thread notifying the number of connections that input data stream has been read. For example, the feeder thread may raise a flag indicating end of input data stream for upload. Upon determining that the client buffer is empty and that the input data stream has been read, at 275, the connections are closed. At 277, polling of the server for status of the upload operation is started. For example, upon determining that the client buffer is empty and that the input data stream has been read the client system may start to poll the server for the status of the upload operation.

At 279, a connection reader thread reads a chunk sent by a corresponding connection sender thread. In response to concurrently sending chunks by the connection sender threads, the connection reader threads concurrently read incoming chunks sent by the connection sender threads. Once the connection reader thread reads the chunk sent by a corresponding connection sender thread, at 280, a check is performed to determine whether the chunk is next in the sequence of chunks that is expected at the server system. For example, it is determined based on the consecutive number or identifier of the chunk in the sequence of chunks. Upon determining that the chunk is next expected, at 281, the chunk is merged to an output stream according the sequence of chunks. At 282, a number of server buffers are scanned for chunks with consecutive numbers subsequent to the merged chunk. At 283, found chunks with the subsequent consecutive numbers are merged to the output stream. The input data stream to be restored at the server system by merging the chunks into the output stream according to their order in the sequence Upon determining that the chunk is not the next one expected, at 284, the chunk is stored to a corresponding server buffer from the number of server buffers. Each connection reader thread is associated with a corresponding server buffer. The number server buffers to store read chunks by the number of connection reader threads.

At 286, a check is performed to determine whether all chunks that are sent by the connection sender threads are processed by the connection reader threads. When not all chunks that are sent by the connection sender threads are processed by the connection reader threads, a connection reader thread reads and processes next chunk received. When all chunks that are sent by the connection sender threads are processed by the connection reader threads, at 288, the input stream is rebuilt at the server system by merging the chunks into the output stream according to the sequence. In one embodiment, the server buffers are searched for chunks with consecutive numbers that are expected next in the sequence of chunks of the output data stream. When a chunk with consecutive number is missing in the server buffers, one of the connections waits for the missing chunk, while chunks incoming from the other connections are stored in corresponding server buffers. Since connections are executed in sessions, chunks transferred over a connection are received at the server system in the order in which the chunks have been sent. Thus, if one connection and the corresponding server buffer for the connection are blocked, other connections may continue to transfer chunks. Connection reader threads that have no more data to transfer are stopped once the server system is notified to clean its data structures.

Although process 200 include series of steps, it will be appreciated that the process 200 is not limited by the illustrated ordering of steps, as some steps may occur in different orders, some concurrently with other steps. For example, the connection reader and sender threads may process chunks concurrently. In some embodiments, the multiple connections protocol supports deploying a deployable package from a client system to a cloud platform over multiple HTTP connections in parallel to speed up the deployment.

Figure 3:
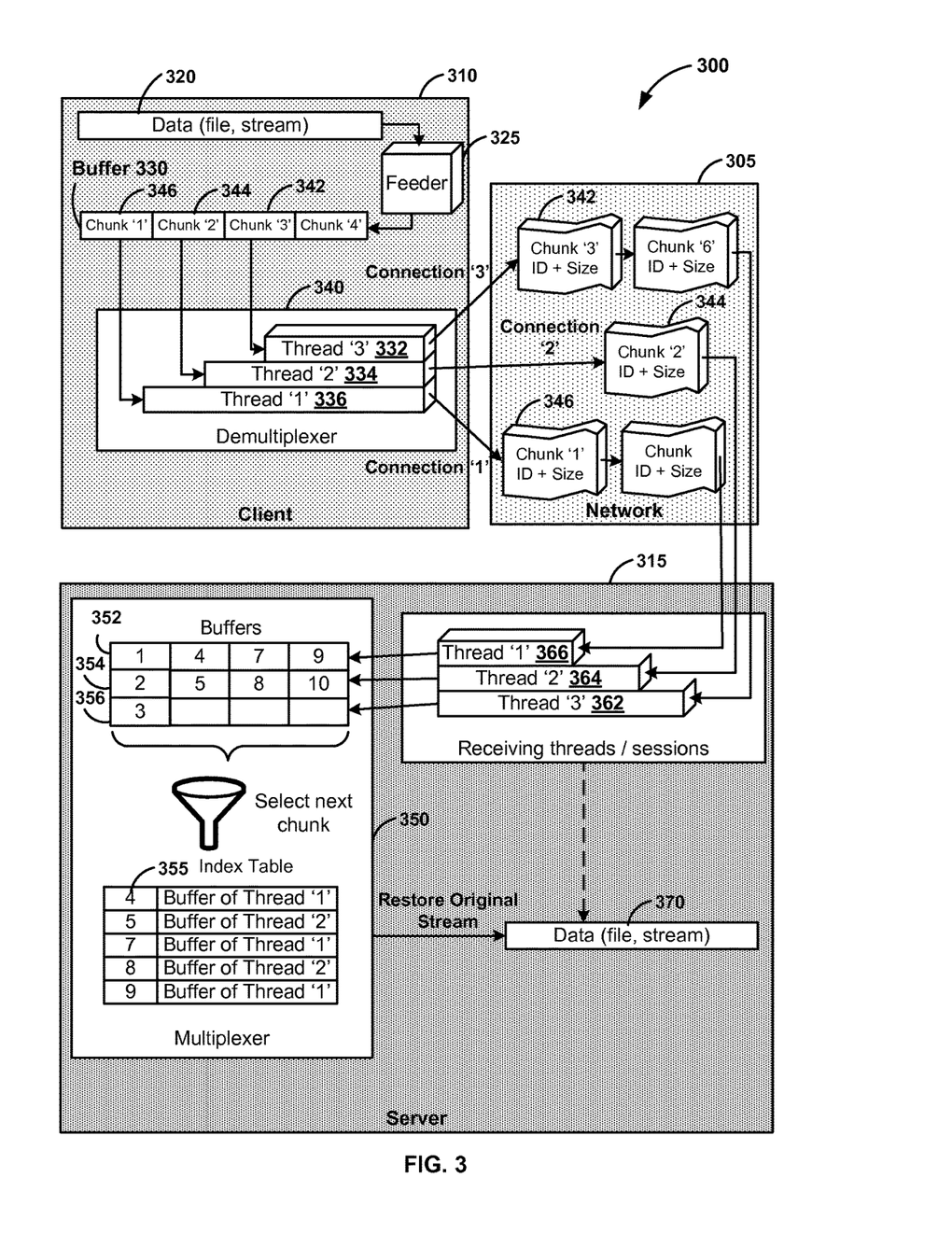
FIG. 3 illustrates a client-server system architecture to deploy a deployable package from a client system to a server system of a cloud platform using multiple connections, according to some embodiments.

FIG. 3 illustrates client-server system architecture 300 to deploy a deployable package 320 from client system 310 to server system 315 of a cloud platform using multiple connections, according to one embodiment. In one embodiment, a request to deploy deployable package 320 is received at client system 310. The deployable package 320 to be deployed from client system 310 to server system 315 of a cloud platform via network 305. Deployable package 320 may be associated with or be pertinent to one or more specific software applications, modules, components, features, services, etc. The deployable package may be an archive file that includes, among other things, application binaries to be deployed on the cloud platform. Examples of a deployable package include, but are not limited to, Java ARchive (JAR), Web application ARrchive (WAR), Enterprise Archive (EAR), Web Application Bundle (WAB), etc.

In various embodiments, a cloud platform is an on-demand runtime platform. A cloud platform may include functionality such as resource pooling, where the computing resources of the cloud infrastructure provider are pooled to serve multiple consumers using a multi-tenant model. Another functionality that the cloud platform may provide is elasticity that refers to the capability of the platform to elastically provision and release computing resources to scale commensurate with demand. The cloud platform may also expose a metering characteristic that refers to the capability of the cloud platform to automatically control, monitor, report, and optimize resource usage at some level of abstraction appropriate to the type of service, for example, storage, processing, bandwidth, and active user accounts, and so on.

A cloud platform can be viewed as containing both a physical layer and an abstraction layer. The physical layer may consist of the hardware resources to support the cloud services being provided, and may typically include a server, a storage unit, network components, and so on. The abstraction layer may include the software deployed across the physical layer, which manifests the essential functionalities provided by a cloud platform. For example, the cloud platform may provide an application runtime, user interface (UI) development toolkits, internal configurations, cloud services such as a connectivity service, a persistence service, an identity service, a feedback service, a document service, etc. The functionality provided by the cloud platform can be used by customers of the cloud platform to develop and deploy software applications on the cloud platform. In one embodiment, customers or consumers of the cloud platform may provide one or more deployable packages representing software applications to be deployed on the cloud platform. In some embodiments, the software applications may be developed using functionality of the cloud platform. Binaries contained in the deployable packages can be executed onto the cloud platform. In various embodiments, the cloud platform may also provide support for the application lifecycle process, for example, deployment, installation, provisioning and maintenance of applications that may be built, deployed, installed and run on the cloud platform. In one embodiment, the cloud platform may be platform-as-a-service implemented in Java.

In one embodiment, client system 310 may be a deploy http client of server system 315. Server system 315 may be an administrative server such as an orchestrator of the cloud platform, according to some embodiments. The administrative server may manage the lifecycle of deployed software applications on the cloud platform. The administration server deploys, starts, and stops the applications, among other things. The administration server may install applications on one or more virtual machines (VMs), where the applications are accessed by end users. The administration server may automatically provision more than one VM to host one application, according to some embodiments.

Once the request to deploy deployable package 320 is received at client system 310, client system 310 determines whether a single or multiple connections protocol is to be used for the requested deploy operation. The single connection protocol supports one connection and the deployable package or content to be uploaded is received with the first PUT request. The response to the PUT request is the deploy operation and a status of the deploy operation. Both synchronous and asynchronous strategies can be used. Client system 310 may request from server system 315 synchronous and asynchronous deployment strategies. The synchronous deployment strategy blocks the response from server system 315 until the deployment operation finishes, successfully or with error. However, once the input stream has been restored at server system 315, server system 315 may continue to process the output stream for deployment. For example, once the output stream is generated and stored on server system 315, the output stream may be validated and transferred from server system 315 to a cloud repository. The cloud repository may be a central file system for the cloud platform where application and cloud platform binaries may be stored. After generating the output stream, finishing deployment may be time consuming for deployable packages with bigger size. Commonly, proxies of the cloud platform may close idle connections for load balancing purposes, among others. For example, connections with timeout above a predefined threshold may be closed by the proxies. Therefore, with the synchronous strategy, although the deployable package may be successfully transferred to server system 315, still deployment may fail due to blocking the response until the whole deployment operation finishes. To avoid this, in one embodiment, client system 310 may request asynchronous deployment strategy.

The multiple connections protocol uses asynchronous deployment strategy to avoid closing idle connections. With the asynchronous deployment strategy, server system 315 periodically returns deployment status, during deployment. Further, server system 315 returns a deployment operation identifier, once the deployment operation is started. The deployment operation identifier is used by client system 310 to poll server system 315 for status of the deployment operation, for example, by a GET request.

Once client system 310 determines that multiple connections protocol is to be used for the requested deploy operation, the number of connections to be used is determined Client system 310 sends a handshake request to server system 315 specifying the number of connections. For example, the handshake request may be performed by a PUT request that include a header specifying the number of connections. The header may indicate the protocol to be used, e.g., single connections or multiple connections protocol. The number of connections may be a maximum number of connections to be established between client system 305 and server system 315. When the deployment operation is accepted, server system 315 sends a response specifying the upload operation identifier to be used by the number of connections to be created. And also, the response specifies a location on server system 315 for status polling of the deployment operation. In some embodiments, server system 315 may deny the deployment request when the specified connections are above a predefined threshold or the cloud platform is not working properly, for example.

Once the deployment operation is accepted, client system 310 creates an instance of demultiplexer, for example, demultiplexer 340. In turn, demultiplexer 340 instantiates and manages feeder thread 325 and connections '1', '2', and '3'. Feeder thread 325 splits deployable package 320 into a sequence of chunks and stores the chunks into buffer 330. The multiple connections '1', '2', and '3' are created from a single client system 310 to one and the same server system 315 of the cloud platform for a single deployment operation.

Further, demultiplexer 340 instantiates a connection sender thread for each of the connections '1', '2', and '3'. For example, thread '3' 332 is associated with connection '3'. Thread '2' 334 is instantiated to transfer data through connection '2'. Thread '1' 336 is instantiated to transfer data through connection '1'. Thus, for a single deploy operation multiple connections '1', '2', and '3' are created. Each connection '1', '2', or '3' runs in a separate session to server system 315. Sessions are authenticated by server system 315. Each connection '1', '2', or '3' runs in a separate session and is associated with a corresponding thread from threads '1' 336, '2' 334, and '3' 332 that transfer data. Feeder thread 325 reads data in chunks from deployable package 320 and stores the chunks into buffer 330. For example, feeder thread 325 filled up buffer 330 with chunk '1', chunk '2', chunk '3', and chunk '4' read from deployable package 320. Threads 1' 336, '2' 334, and '3' 332 in parallel read chunks from buffer 330. Feeding or storing chunks to buffer 330 by feeder thread 325 is faster compared to each thread from threads 1' 336, '2' 334, and '3' 332 reading chunks directly from deployable package 330. Thus, feeder thread 325 accelerates the processing of loading threads '1' 336, '2' 334, and '3' 332 with data chunks for transfer.

In one embodiment, in parallel, in response to creating connections '1', '2', and '3', server system 315 creates an instance of a multiplexer, for example, multiplexer 350. In turn, multiplexer 345 instantiates a reader thread for each sender thread '1' 336, '2' 334, and '3' 332, respectively. For example, sender thread '1' 336 sends chunks to reader thread '1' 366, and reader thread '1' 366 reads chunks sent by sender thread '1' 336, respectively. Sender thread '2' 334 sends chunks to reader thread '2' 364, and reader thread '2' 364 reads chunks sent by sender thread '2' 334. Sender thread '3' 332 sends chunks to reader thread '3' 362, and reader thread '3' 362 reads chunks sent by sender thread '3' 332. Sender threads 332-336 continuously and in parallel read chunks from buffer 330 and send those chunks via network 305 to corresponding reader threads 362-366. For example, thread 336 reads chunk '1' 346 from buffer 330 and sends chunk '1' 346 through connection '1' to thread '1' 366. Thread 334 reads chunk '2' 344 from buffer 330 and sends chunk '2' 344 through connection '2' to thread '2' 364. Thread 332 reads chunk '3' 342 from buffer 330 and sends chunk '3' 342 through connection '3' to thread '3' 362.

Further, multiplexer 350 creates buffer 352 associated with reader thread '1' 366, buffer 354 associated with reader thread '2' 364, and buffer 356 associated with thread '3' 362, respectively. Reader threads 362-366 either store read chunks into corresponding buffers 352-356 or may directly write the read chunks to output data stream 370. When a reader thread from reader threads 362-366 reads a chunk sent by a corresponding sender thread, from sender threads 332-336, the reader thread notifies multiplexer 350 indicating the consecutive identifier of the read chunk. Multiplexer 350 may determine based on a counter whether the consecutive identifier is next one expected to be merged or appended to output stream 370. In one embodiment, a current value of the counter may indicate the next chunk expected. For example, once a chunk has been merged to output stream 370, the counter is incremented to indicate consecutive identifier of the next chunk expected. Once multiplexer 350 determines that the chunk is next expected, the reader thread directly writes the chunk to output stream 370 instead of to a corresponding server buffer from server buffers 352-356. Alternatively, when multiplexer 350 determines that the chunk is not the next expected, the reader thread stores the chunk into corresponding server buffer from buffer 352-356. Once the next expected chunk is merged to output stream 370, the counter is incremented, and multiplexer 350 based on index table 355, determines whether the chunk with next consecutive number is stored in one of buffers 352-356. For example, once chunk '6' is received by thread 362, chunk '6' may be directly merged to output stream 370 and multiplexer 350 may search into the index table 355 to determine whether subsequent chunks are available, e.g., stored in buffers 352-356. In the illustrated example in FIG. 3, multiplexer 350 identifies that chunks '7', '8', '9', and '10' are available in buffers 352-356. Based on index table 355, multiplexer 350 identifies corresponding server buffers 352 and 354 that stores chunks '7', '8', '9', and '10'. Multiplexer 350 reads chunks '7', '8', '9', and '10' from the identified server buffers 352 and 354 and write them to output stream 370, according to their consecutive identifiers.

As illustrates in FIG. 3, connection '3' may be slower than connection '1' and '2'. Accordingly, thread 332 and thread 362 of connection '3' are slower than other threads associated with connection '1' and '2', respectively. Connection '3' managed to transfer chunk '3', but chunk '6' is yet to be transferred. Since sender threads 336 and 334, and reader threads 366 and 364 are faster, buffer 352 and buffer 354 are already filled up. Since chunk '6' is missing in index table 355 of multiplexer 350, the rebuilt of the input stream may be blocked until chunk '6' arrives at server system 315. The buffer of a slow connection would not be filled up with data from other connections, if previous chunks are not yet received to prevent a deadlock. For example, chunk '11' would not be stored in buffers 352-356 until chunk '6' arrives.

In one embodiment, output stream 370 representing the restored original input stream is stored on server system 315. Once the output stream is generated and stored on server system 315, the output stream may be validated and transferred from server system 315 to a cloud repository. The cloud repository may be a central file system for the cloud platform where application and cloud platform binaries may be stored.

In some embodiments, as an alternative to rebuilding the data on the server system 315 a Random Access File (RAF) may be used. This will simplify the logic since server buffers 352-356 and index table 355 would not be necessary. Instead threads may write the chunks directly on a file system of server system 315 by calculating the offset of each chunk.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
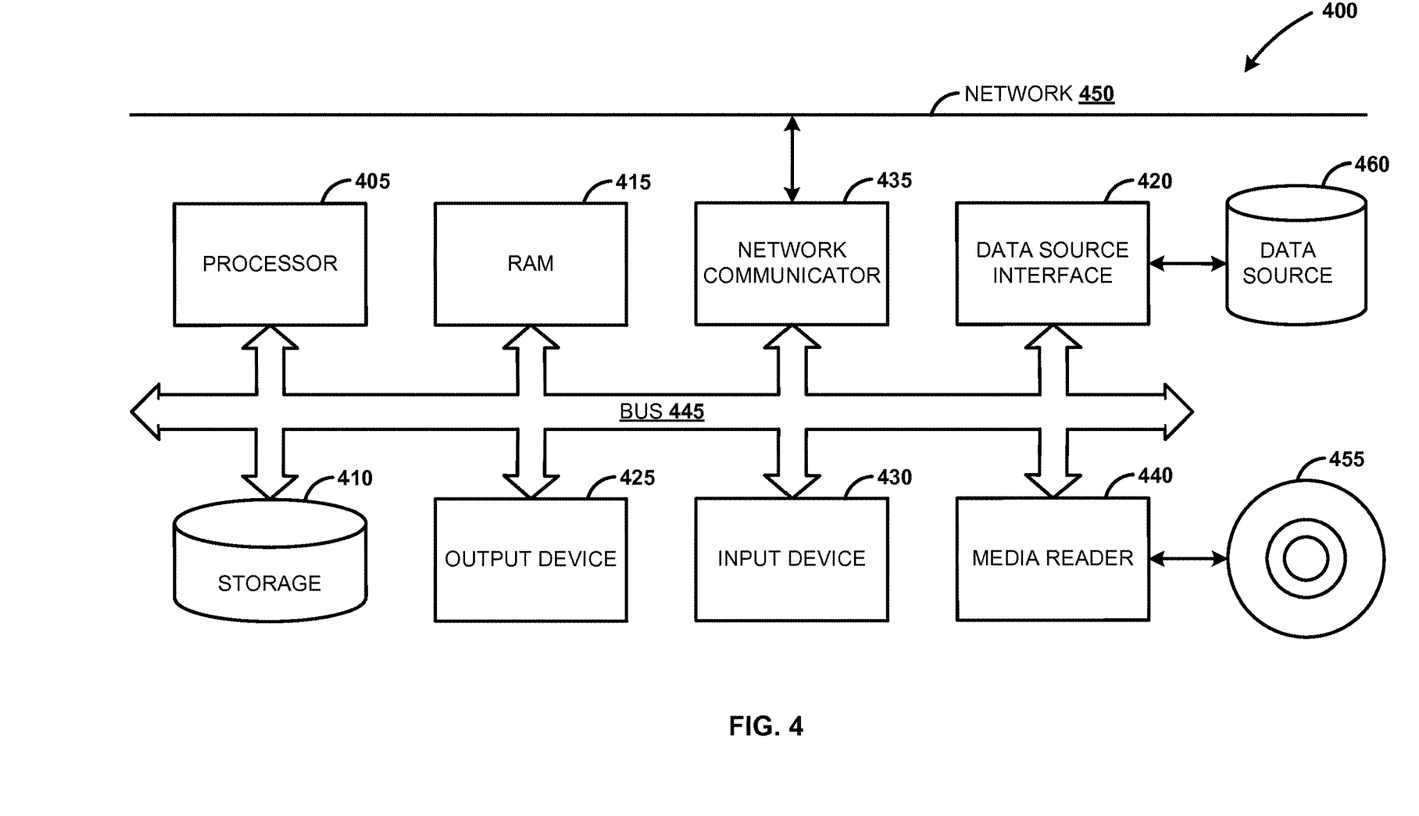
FIG. 4 illustrates an exemplary computer system, according to some embodiments.

FIG. 4 is a block diagram of an exemplary computer system 400. The computer system 400 includes a processor 405 that executes software instructions or code stored on a computer readable storage medium 455 to perform the above-illustrated methods. The processor 405 can include a plurality of cores. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. According to some embodiments, such as some in-memory computing system embodiments, the RAM 415 can have sufficient storage capacity to store much of the data required for processing in the RAM 415 instead of in the storage 410. In some embodiments, all of the data required for processing may be stored in the RAM 415. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to receive data through a plurality of connections, the method comprising:
   receiving a request to establish the plurality of connections;
   sending a response to the request comprising an identifier of an upload operation and a location to be polled for status of the upload operation;
   creating a plurality of connection reader threads corresponding to the plurality of connections, wherein the plurality of connection reader threads corresponds to a plurality of server buffers;
   receiving a sequence of chunks at the plurality of connection reader threads through the plurality of connections, wherein each of the plurality of connections is associated with the identifier of the upload operation;
   reading, via a connection reader thread of the plurality of connection reader threads, one or more chunks from the sequence of chunks;
   writing the one or more chunks from the sequence of chunks to a server buffer of the plurality of server buffers, wherein the connection reader thread from the plurality of connection reader threads corresponds to the server buffer;
   searching in the plurality of server buffers for a chunk with a consecutive number expected next for an output data stream;
   when the chunk with the consecutive number expected next is missing in the plurality of server buffers, blocking the connection reader thread and the server buffer until the chunk with the consecutive number expected next is read by a different connection reader thread of the plurality of connection reader threads;
   when the chunk with the consecutive number next expected is read by the different connection reader thread, adding the chunk with the consecutive number expected next to the output data stream; and
   merging chunks from the plurality of server buffers into the output data stream according to the sequence.

2. The method of claim 1, wherein receiving the sequence of chunks at the plurality of connection reader threads further comprises:
   at a client system:
      reading in chunks an input data stream by a feeder thread, wherein a chunk from the sequence of chunks includes a chunk identifier representing a consecutive number of the chunk in the sequence and a size of the chunk;
      writing the sequence of chunks into a client buffer, wherein the sequence of chunks to be read from the client buffer by a plurality of connection sender threads; and
      upon reading the input data stream, the feeder thread notifying the plurality of connections that the input data stream has been read.

3. The method of claim 1, further comprising:
   upon determining that a consecutive number of the read chunk is next in the sequence of chunks expected, rebuilding an input data stream by merging the read chunk to the output data stream according to the sequence of chunks.

4. The method of claim 1, further comprising:
upon determining that a consecutive number of the read chunk is different from an expected consecutive number, writing the chunk to a corresponding server buffer from the plurality of server buffers.

5. The method of claim 1 further comprising:
when the plurality of connections is closed, receiving a polling request for the status of the upload operation, wherein the polling request comprises the identifier of the upload operation; and
sending a response comprising the status of the upload operation.

6. A computer system to receive data by a plurality of connections, the system comprising:
a memory to store computer executable instructions;
at least one computer processor coupled to the memory to execute the instructions, to perform operations comprising:
receiving a request to establish the plurality of connections;
sending a response to the request comprising an identifier of an upload operation and a location to be polled for status of the upload operation;
creating a plurality of connection reader threads corresponding to the plurality of connections, wherein the plurality of connection reader threads corresponds to a plurality of server buffers;
receiving a sequence of chunks at the plurality of connection reader threads through the plurality of connections, wherein each of the plurality of connections is associated with the identifier of the upload operation;
reading, via a connection reader thread of the plurality of connection reader threads, one or more chunks from the sequence of chunks;
writing the one or more chunks from the sequence of chunks to a server buffer of the plurality of server buffers, wherein the connection reader thread from the plurality of connection reader threads corresponds to the server buffer;
searching in the plurality of server buffers for a chunk with a consecutive number expected next for an output data stream;
when the chunk with the consecutive number expected next is missing in the plurality of server buffers, blocking the connection reader thread and the server buffer until the chunk with the consecutive number expected next is read by a different connection reader thread of the plurality of connection reader threads;
when the chunk with the consecutive number expected next is read by the different connection reader thread, adding the chunk with the consecutive number expected next to the output data stream; and
merging chunks from the plurality of server buffers into the output data stream.

7. The system of claim 6, wherein the operations further comprising:
at a client system:
reading in chunks an input data stream by a feeder thread, wherein a chunk from the sequence of chunks includes a chunk identifier representing a consecutive number of the chunk in the sequence and a size of the chunk;
writing the sequence of chunks into a client buffer, wherein the sequence of chunks to be read from the client buffer by a plurality of connection sender threads; and
upon reading the input data stream, the feeder thread notifying the plurality of connections that the input data stream has been read.

8. The system of claim 6, wherein:
the plurality of server buffers to store chunks transferred by the plurality of connection reader threads, and the corresponding connection reader thread from the plurality of connection reader threads reading a chunk from the one or more chunks sent by a corresponding connection sender thread from a plurality of connection sender threads.

9. The system of claim 8, wherein the operations further comprising:
upon determining that a consecutive number of the read chunk is next in the sequence of chunks expected, rebuilding an input data stream by merging the read chunk to the output data stream according to the sequence of chunks.

10. The system of claim 8, wherein the operations further comprising:
upon determining that a consecutive number of the read chunk is different from the expected consecutive number, writing the chunk to a corresponding server buffer from the plurality of server buffers.

11. The system of claim 6, wherein the operations further comprising:
when the plurality of connections is closed, receive a polling request for the status of the upload operation, wherein the polling request comprises the identifier of the upload operation; and
send a response comprising the status of the upload operation.

12. A non-transitory computer readable storage medium having instructions encoded thereon that, when executed by a processor, cause the processor to perform operations comprising:
receive a request to establish a plurality of connections;
send a response to the request comprising an identifier of an upload operation and a location to be polled for status of the upload operation;
create a plurality of connection reader threads corresponding to the plurality of connections, wherein the plurality of connection reader threads corresponds to a plurality of server buffers;
receive a sequence of chunks at the plurality of connection reader threads through the plurality of connections, wherein each of the connections of the plurality of connections is associated with the identifier of the upload operation;
read, via a connection reader thread of the plurality of connection reader threads, one or more chunks from the sequence of chunks;
write the one or more chunks from the sequence of chunks to a server buffer of the plurality of server buffers, wherein the connection reader thread from the plurality of connection reader threads corresponds to the server buffer;
search in the plurality of server buffers for a chunk with a consecutive number expected next for an output data stream;
when the chunk with the consecutive number expected next is missing in the plurality of server buffers, block the connection reader thread and the server buffer until the chunk with the consecutive number expected next is read by a different connection reader thread of the plurality of connection reader threads;

when the chunk with the consecutive number expected next is read by the different connection reader thread, add the chunk with the consecutive number expected next to the output data stream; and merge chunks from the plurality of server buffers into the output data stream.

* * * * *